US012807002B2

(12) United States Patent
Salter et al.

(10) Patent No.: US 12,807,002 B2
(45) Date of Patent: Nov. 24, 2026

(54) TRACTION BATTERY ATTEMPTED SELF-CHARGE DETECTION METHOD AND SYSTEM

(71) Applicant: Ford Global Technologies, LLC, Dearborn, MI (US)

(72) Inventors: Stuart C. Salter, White Lake, MI (US); Mark J. Ferrel, Brighton, MI (US); Brendan Diamond, Grosse Pointe, MI (US); Vyas Darshan Shenoy, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 902 days.

(21) Appl. No.: 18/296,396

(22) Filed: Apr. 6, 2023

(65) Prior Publication Data

US 2024/0336142 A1 Oct. 10, 2024

(51) Int. Cl.

*B60L 3/00* (2019.01)
*B60L 1/00* (2006.01)
*B60L 53/16* (2019.01)
*B60L 58/10* (2019.01)

(52) U.S. Cl.

CPC ............ *B60L 3/0046* (2013.01); *B60L 1/006* (2013.01); *B60L 53/16* (2019.02); *B60L 58/10* (2019.02); *B60L 2240/547* (2013.01); *B60L 2250/10* (2013.01); *B60L 2250/16* (2013.01)

(58) Field of Classification Search

None

See application file for complete search history.

(56) References Cited

U.S. PATENT DOCUMENTS 9,662,989 B2 5/2017 Watanabe et al.
2012/0161778 A1* 6/2012 Fernandez Banares ..................... G01R 31/52 324/503
2014/0117933 A1* 5/2014 Nyu ........................ B60L 53/62 320/109
2017/0246962 A1 8/2017 Weber et al.
2019/0023130 A1 1/2019 Garcha
2019/0184837 A1 6/2019 Najmabadi
2023/0018340 A1* 1/2023 Valavanur Umasankar ................ B60L 58/13

FOREIGN PATENT DOCUMENTS

WO 20100096502 8/2010

* cited by examiner

*Primary Examiner* — Arun C Williams
(74) *Attorney, Agent, or Firm* — David B. Kelley; Carlson, Gaskey & Olds, P.C.

(57) ABSTRACT

A vehicle charge control method includes detecting that a vehicle is discharging electrical power, and detecting that the vehicle is, during the discharging, attempting a charging of a traction battery of the vehicle by receiving electrical power. The method assesses whether the electrical power that is discharging is used for attempting the charging, and then responds to the assessing.

18 Claims, 3 Drawing Sheets

TRACTION BATTERY ATTEMPTED SELF-CHARGE DETECTION METHOD AND SYSTEM

TECHNICAL FIELD

This disclosure relates generally to method and systems that detect an attempt to self-charge a traction battery of a vehicle.

BACKGROUND

An electrified vehicle differs from a conventional motor vehicle because a drivetrain of the electrified vehicle includes one or more electric machines that can drive the electrified vehicle instead of, or in addition to, an internal combustion engine. The electrified vehicle can include a traction battery pack that stores energy. The electrified vehicle can power the one or more electric machines from the traction battery pack. In some electrified vehicles, the traction battery pack can be used to power external devices, such as tools at a worksite, or another electrified vehicle.

SUMMARY

In some aspects, the techniques described herein relate to a vehicle charge control method, including: detecting that a vehicle is discharging electrical power; detecting that the vehicle is, during the discharging, attempting a charging of a traction battery of the vehicle by receiving electrical power; assessing whether the electrical power that is discharging is used for attempting the charging; and responding to the assessing.

In some aspects, the techniques described herein relate to a method, wherein the responding includes stopping the discharging.

In some aspects, the techniques described herein relate to a method, wherein the responding includes stopping the charging.

In some aspects, the techniques described herein relate to a method, wherein the responding includes providing an alert.

In some aspects, the techniques described herein relate to a method, wherein the alert is an audible alert.

In some aspects, the techniques described herein relate to a method, wherein the alert is a visual alert.

In some aspects, the techniques described herein relate to a method, wherein the responding includes stopping the charging, and the alert includes information about the stopping.

In some aspects, the techniques described herein relate to a method, wherein the responding includes stopping the charging, and the alert includes information about charging stations that are closest to the vehicle.

In some aspects, the techniques described herein relate to a method, wherein the discharging is through an outlet of the vehicle.

In some aspects, the techniques described herein relate to a method, wherein the assessing includes comparing an electrical parameter of the electrical power that is discharging to the same electrical parameter of the electrical power that is attempting the charging.

In some aspects, the techniques described herein relate to a method, wherein the electrical parameter is a voltage.

In some aspects, the techniques described herein relate to a method, wherein the electrical parameter is a waveform.

In some aspects, the techniques described herein relate to a method, wherein the assessing includes introducing noise into the electrical power that is discharging from the vehicle, and then detecting whether or not the electrical power that is received by the vehicle when attempting the charging includes the noise.

In some aspects, the techniques described herein relate to a method, wherein the assessing includes introducing a signal into the electrical power that is discharging from the vehicle, and then detecting whether or not the electrical power that is received by the vehicle when attempting the charging includes the signal.

In some aspects, the techniques described herein relate to a method, wherein this signal is a frequency modulated signal.

In some aspects, the techniques described herein relate to a method, wherein the electrical power that is discharging is the electrical power discharged from a first electrical outlet of the vehicle, and further including detecting a discharging of electrical power from a different, second electrical outlet of the vehicle.

In some aspects, the techniques described herein relate to a method, wherein the assessing includes assessing whether the electrical power that is discharging from the first outlet is used for the charging, and assessing whether the electrical power that is discharging from the second outlet is used for the charging.

In some aspects, the techniques described herein relate to a method, wherein the vehicle is receiving the electrical power that is attempting the charging through a charge port of the vehicle.

In some aspects, the techniques described herein relate to a vehicle charge control system, including: a charge port that receives electrical power to attempt a charge of a traction battery of a vehicle; one or more electrical outlets that discharge electrical power from the vehicle; and a control module that assesses whether the electrical power that is discharging is used for the charging.

In some aspects, the techniques described herein relate to a vehicle charge control system, wherein the control module initiates an alert if the electrical power that is used to attempt the charge of the traction battery is the electrical power that is discharged from the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary methods and systems used to detect an attempt to self-charge a traction battery of an electrified vehicle. Generally, an attempted self-charge is an attempt to charge the traction battery using electrical power that is discharged from the traction battery. This can occur when a user couples a charger to both an electrical outlet of the electrified vehicle and to a charge port of the electrified vehicle.

Figure 1:
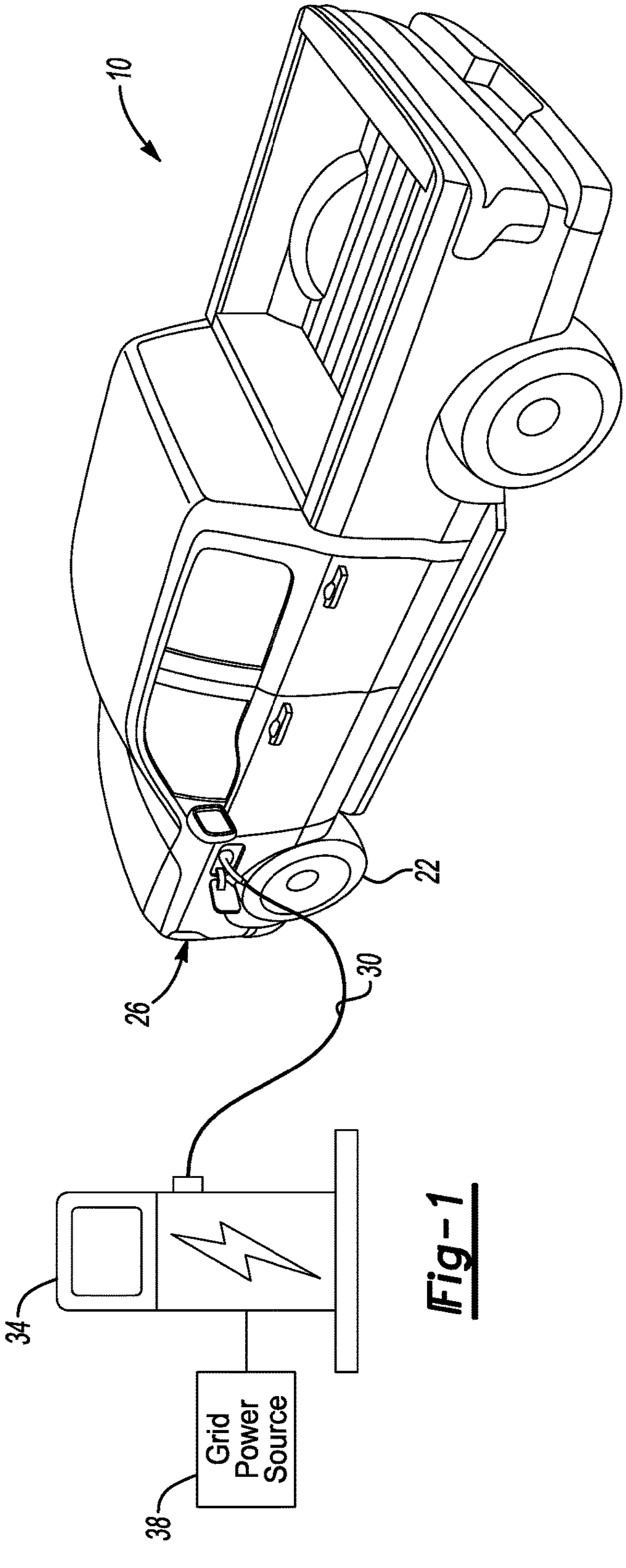
FIG. 1 illustrates a perspective view of an electrified vehicle coupled to an external power source with a charger.
Figure 2:
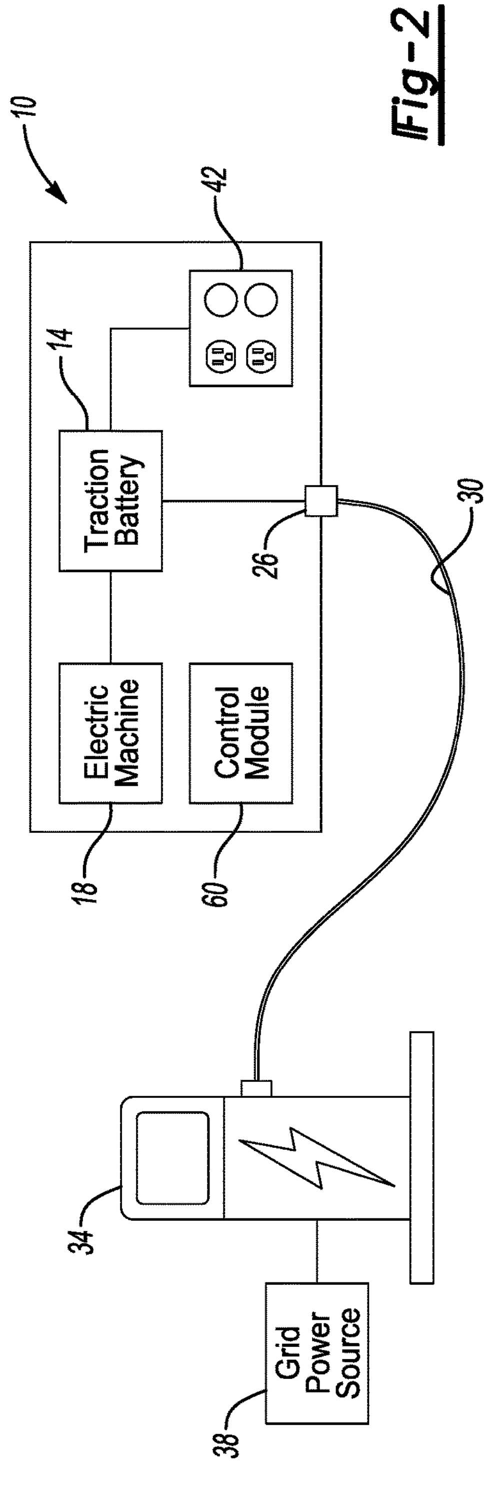
FIG. 2 illustrates a schematic view of the electrified vehicle of FIG. 1.

With reference to FIGS. 1 and 2, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery. Although shown schematically, the traction battery pack 14 may be configured as a high voltage traction battery pack that includes a plurality of battery arrays (i.e., battery assemblies or groupings of battery cells) capable of outputting electrical power.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

The electrified vehicle 10 includes a charge port 26. A charger 30 can connect to the charge port 26. The charger 30 can be connected to Electric Vehicle Supply Equipment (EVSE) 34. The charger 30 can thus operably connected the vehicle 10 to the EVSE 34. In an embodiment, the EVSE 34 is connected to an external power source-here a grid power source 38. Electrical power from the grid power source can pass through the EVSE 34, the charger 30, and through the charge port 26 to the traction battery 14 to increase an amount of electrical energy stored in the traction battery 14.

The charger 30 and EVSE 34 may be configured to provide any level of charging (e.g., Level 1 AC charging, Level 2 AC charging, DC charging, etc.). In this example, the grid power source 38 is the external power source. In another example, the EVSE 34 is omitted and the external power source is provided by another electrified vehicle that is electrically coupled to the vehicle 10.

Figure 3A:
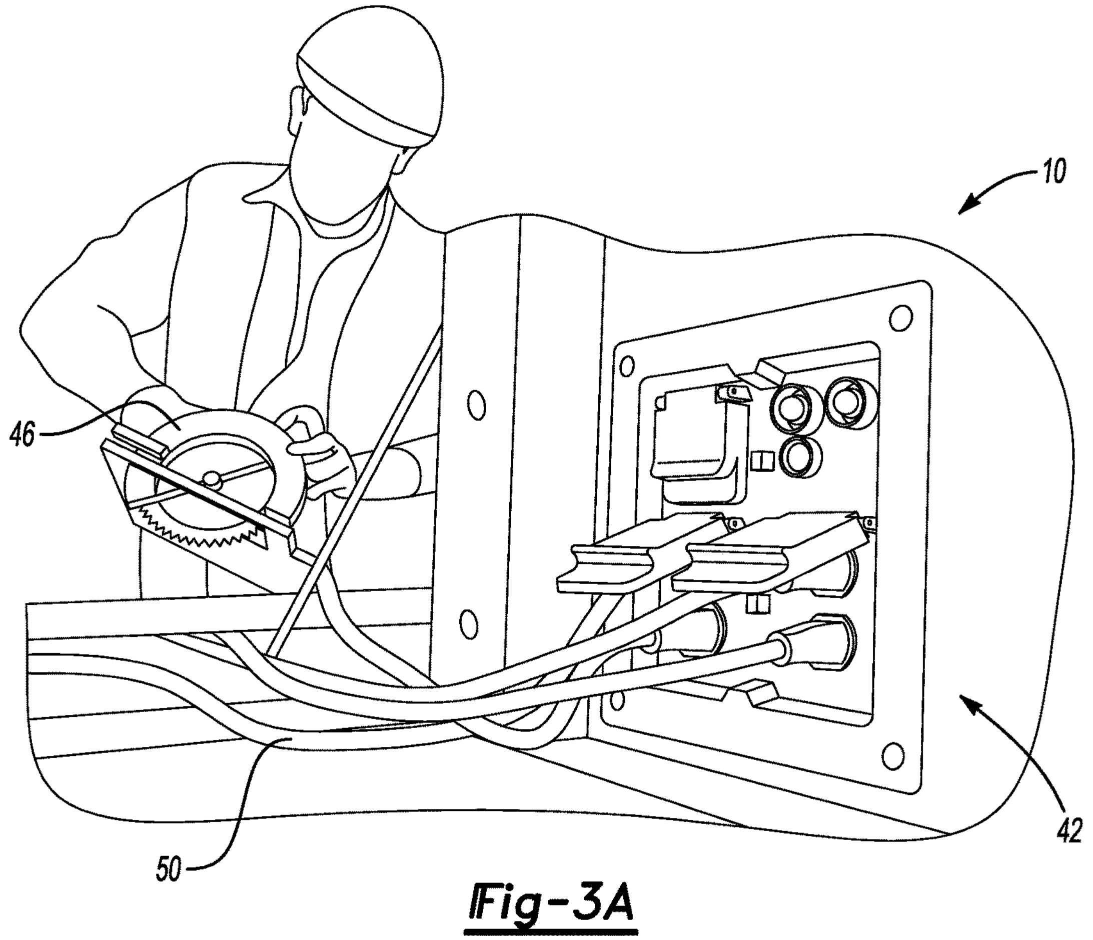
FIGS. 3A and 3B illustrate close-up views of electrical outlets of the electrified vehicle of FIG. 1 when the electrical outlets are powering external devices.
Figure 3B:
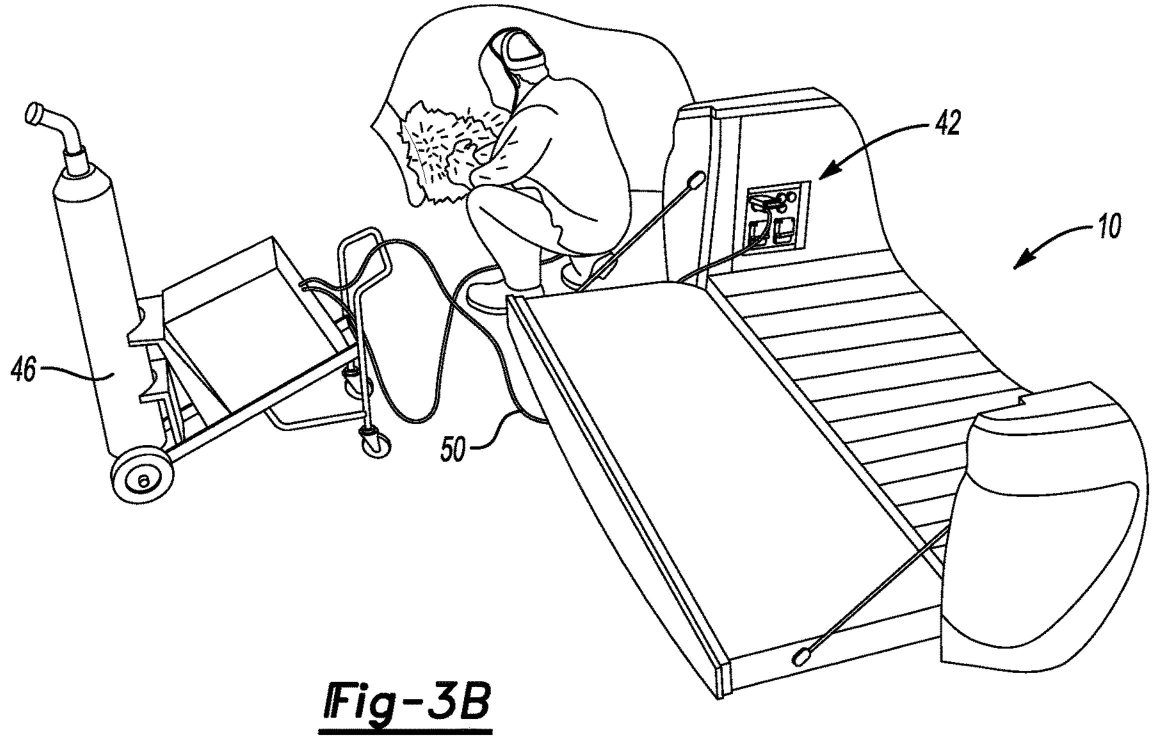

With reference now to FIGS. 3A and 3B and continuing reference to FIGS. 1 and 2, the electrified vehicle 10 includes a plurality of electrical outlets 42. The electrical outlets 42 can be DC or AC outlets, for example.

External devices 46 (i.e., devices other than the vehicle 10) can include electrical cords 50 that can plug in to one of the electrical outlets 42 to electrically couple the external device 46 to the vehicle 10.

The vehicle 10 can then deliver electrical power from the traction battery 14 to the external device 46 through the electrical outlet 42.

The external devices 46 are power tools in this example, such as circular saws and welders. The external devices 46 could include a compound miter saw, hammer drill, or air compressor. The external devices 46 could be electrical circuits within a residential home.

In general, in this example, electrical power used to charge the traction battery 14 can be delivered to the vehicle 10 through the charge port 26. Electrical power drawn from the traction battery 14 for powering external devices 46 can be delivered through the electrical outlets 42.

When the charger 30 is coupled to the charge port 26 and electrical power is routed through the charger 30 and the charge port 26 to the traction battery 14, the electrified vehicle 10 is considered to be charging the traction battery 14. The electrified vehicle 10 is considered to be discharging electrical power when the electrified vehicle 10 is powering one or more external devices 46 through respective electrical outlets 42

The vehicle 10 includes a control module 60 that may include both hardware and software and could be part of an overall vehicle control system, such as a vehicle system controller (VSC), or could alternatively be a stand-alone controller separate from the VSC. In an embodiment, the control module 60 is programmed with executable instructions for interfacing with and commanding operations of various charging-related and discharging-related components of the vehicle 10.

The control module 60 may include a processor and non-transitory memory for executing various control strategies and modes associated with charging and discharging. The processor can be a custom made or commercially available processor, a central processing unit (CPU), or generally any device for executing software instructions. The memory can include any one or combination of volatile memory elements and/or nonvolatile memory elements.

The processor may be operably coupled to the memory and may be configured to execute one or more programs stored in the memory of the control module 60 based on various inputs received from other devices, such as inputs from a server system, a telecommunications module, a Global Positioning System, a Human Machine Interface, the traction battery pack 14, etc.

The control module 60 may receive and process various inputs for coordinating charging and discharging. Inputs received could include electrical parameters associated with the electrical power received through the charge port 26 for charging, or electrical parameters associated with the electrical power output through the electrical outlet 42 during discharging. The electrical parameter could be voltage, current, or power, for example.

Figure 4:
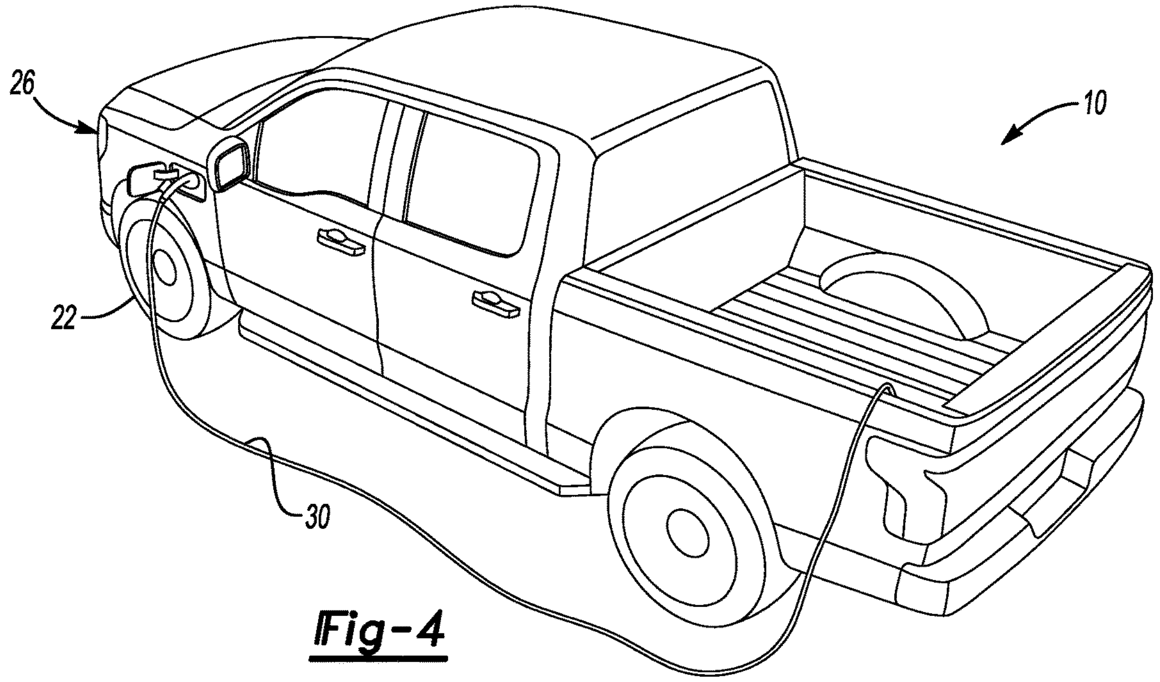
FIG. 4 illustrates the electrified vehicle of FIG. 1 during an attempted self-charge.
Figure 5:
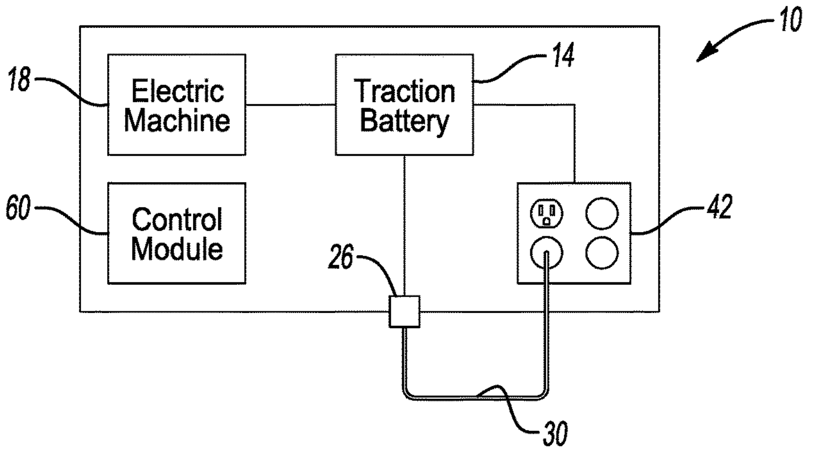
FIG. 5 illustrates a schematic view of the electrified vehicle of FIG. 4.

With reference now to FIGS. 4 and 5, from time to time, a user may purposely or inadvertently attempt a self-charge of the traction battery 14 by coupling the charger 30 to the charge port 26 and to one or more of the electrical outlets 42. As can be appreciated, charging the traction battery 14 using only electrical power discharged from the traction battery 14 will not increase a charge level of the traction battery 14. In fact, due to losses, a charge level in traction battery 14 will decrease over time.

Figure 6:
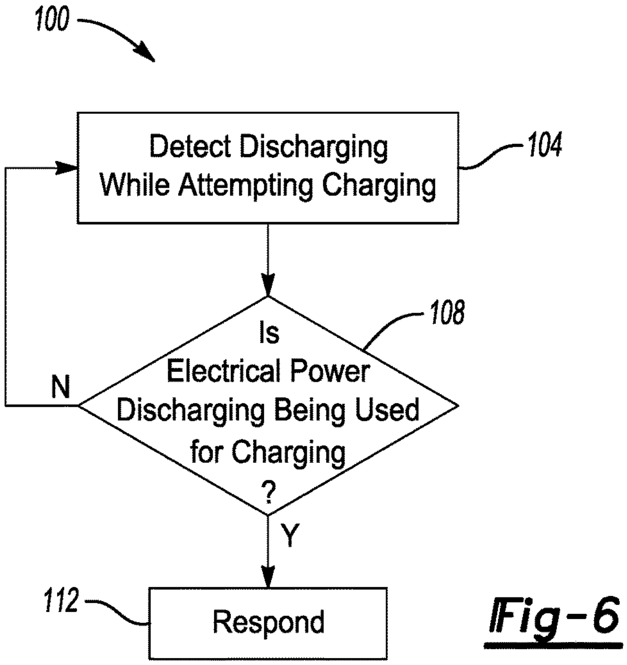
FIG. 6 illustrates a flow of a method associated with detecting the attempted self-charge of FIG. 4.

With reference now to FIG. 6 and continuing reference to FIGS. 4 and 5, an exemplary method 100 of detecting a self-charge begins at a step 104 where the method detects a discharging of electrical power from the vehicle 10 while attempting a charging of a traction battery 14 of the vehicle 10. The method 100 can be carried out by the control module 60 of the vehicle 10.

If discharging while attempting a charging is detected at the step 104, the method 100 then assesses whether the electrical power that is discharging is used for the charging at a step 108. If so, the method 100 moves to a step 112 where the method 100 responds to the assessing. If not, the method 100 returns to the step 104.

The response to the assessing at the step 112, and thus the response to an attempted self-charge, can be an automatic stopping of the discharging, a stopping of the charging, or both. The response to the assessing at the step 112 could instead or additionally include initiating an alert to the user. The alert can be an audible alert, a visual alert, or both. The alerts can include alerts on a smartphone, alerts on screens of the vehicle, audible chimes or alarms from speakers of the vehicle, from outside the vehicle (using sound exciters), etc. Alerts on a smartphone and/or screens of the vehicle 10 may further explain why this charging configuration will not increase the charge state of the traction battery 14 and, further, may list several methods for charging, such as how to connect to another electrified vehicle or the location and distance of nearby charging stations.

The assessing step 108 can, in some examples, include a comparing of the total electrical power being discharged through the electrical outlet 42 to the electrical power being received at the charge port 26. If the comparison reveals that the electrical power being discharged is about the same as the electrical power being received, for example within five percent, the method 100 interprets this as a possible attempted self-charge and proceeds to collect additional information.

The assessing step 108 could collect additional information by comparing an electrical parameter of the electrical power being output through the electrical outlet 42 to an electrical parameter of the electrical power being input through the charge port 26. If the electrical parameters are reasonably close, within for example five percent, the assessing step 108 can interpret this as confirmation of the attempted self-charge. The electrical parameter could be voltage, for example, and the comparison of the voltages can account for voltage drop, sensor error, etc.

The control module 60 can compare the charge current waveform to the discharge current waveform to determine if they are following the same pattern or a known charge pattern associated with the vehicle. In this example, the charge port 26 of vehicle 10 draws current from the electrical outlet at one amp per second, which would be an exemplary identifiable pattern.

If the charge current waveform and the discharge current waveform are substantially following the same pattern, the method 100 can interpret this as confirmation of the attempted self-charge. Following a very similar pattern with minimal delay can be determined via various types of correlation signal analysis such as Pearson's correlation coefficient, or a delay and offset compensation mean squared error assessment.

The method 100 could collect additional information by introducing noise, such as high-frequency current or voltage noise, into the electrical power being discharged. The method 100 then assesses whether the electrical power received through the charge port 26 has the same noise. This analysis can be performed using a fast Fourier transform. The method 100 can interpret the introduced noise being detected at the charge port 26 as confirmation of an attempted self-charge.

The method 100 could collect additional information by introducing a signal, such as a low-level amplitude, amplitude modulated signal, or frequency modulated signal, into the electrical power being discharged. The signal can be conducted though the charger 30 and decoded at the charge port 26. The signal could carry an encrypted or non-encrypted signal unique to the vehicle 10, such as a vehicle identification number or a factory code. The method 100 can interpret the introduced signal being detected at the charge port 26 as confirmation of an attempted self-charge.

In some examples, the method at the step 112 can include presenting a user with an option to override the vehicle 10 interpreting an attempted self-charge. This may be useful in the unlikely event that the vehicle 10 has incorrectly identified an attempted self-charge.

The method 100 can thus analyze the profile of the electrical power that is transferred to the vehicle 10 through the charge port 26, and the profile of the electrical power that is transferred from the vehicle 10 through the electrical outlet 42. The analysis is to determine similarities in their current and voltage signal pattern, magnitudes, and timing. This helps to determine if a user is attempting to self-charge the vehicle 10.

The example vehicle 10 includes no charge ports other than the charge port 26. There are, however, a plurality of electrical outlets 42, each individually capable of providing electrical power.

The assessing of the electrical power that is discharging can include assessing output power from each of the individual electrical outlets 42. There could be an instance where one of the electrical outlets 42 is being used to power one or more of the external devices 46, and another of the electrical outlets 42 is used for an attempted self-charge. As such, the method 100, in this example, can analyze individual circuits through each of the electrical outlets 42 rather than analyzing a total of the electrical power outlet from the vehicle 10.

If the vehicle 10 has more than one charge port 26, the electrical power passing through each of those charge ports could be individually analyzed with respect to the electrical power output from each of the individual electrical outlets 42.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle charge control method, comprising:
detecting that a vehicle is discharging electrical power;
detecting that the vehicle is, during the discharging, attempting a charging of a traction battery of the vehicle by receiving electrical power through a charge port of the vehicle;
assessing whether the electrical power that is discharging is used for attempting the charging; and
responding to the assessing.

2. The method of claim 1, wherein the responding includes stopping the discharging.

3. The method of claim 1, wherein the responding includes stopping the charging.

4. The method of claim 1, wherein the responding includes providing an alert.

5. The method of claim 4, wherein the alert is an audible alert.

6. The method of claim 4, wherein the alert is a visual alert.

7. The method of claim 4, wherein the responding includes stopping the charging, and the alert includes information about the stopping.

8. The method of claim 4, wherein the responding includes stopping the charging, and the alert includes information about charging stations that are closest to the vehicle.

9. The method of claim 1, wherein the discharging is through an outlet of the vehicle.

10. The method of claim 1, wherein the assessing includes comparing an electrical parameter of the electrical power that is discharging to the same electrical parameter of the electrical power that is attempting the charging.

11. The method of claim 10, wherein the electrical parameter is a voltage.

12. The method of claim 10, wherein the electrical parameter is a waveform.

13. The method of claim 1, wherein the assessing includes introducing noise into the electrical power that is discharging from the vehicle, and then detecting whether or not the electrical power that is received by the vehicle when attempting the charging includes the noise.

14. The method of claim 1, wherein the assessing includes introducing a signal into the electrical power that is discharging from the vehicle, and then detecting whether or not the electrical power that is received by the vehicle when attempting the charging includes the signal.

15. The method of claim 14, wherein this signal is a frequency modulated signal.

16. A vehicle charge control method, comprising:

detecting that a vehicle is discharging electrical power;

detecting that the vehicle is, during the discharging, attempting a charging of a traction battery of the vehicle by receiving electrical power;

assessing whether the electrical power that is discharging is used for attempting the charging; and responding to the assessing, wherein the electrical power that is discharging is the electrical power discharged from a first electrical outlet of the vehicle, and further comprising detecting a discharging of electrical power from a different, second electrical outlet of the vehicle.

17. The method of claim 16, wherein the assessing includes assessing whether the electrical power that is discharging from the first outlet is used for the charging, and assessing whether the electrical power that is discharging from the second outlet is used for the charging.

18. A vehicle charge control system, comprising:

a charge port that receives electrical power to attempt a charge of a traction battery of a vehicle;

one or more electrical outlets that discharge electrical power from the vehicle; and a control module that assesses whether the electrical power that is discharging is used for the charging, wherein the control module initiates an alert if the electrical power that is used to attempt the charge of the traction battery is the electrical power that is discharged from the vehicle.

* * * * *